United States Patent [19]

Schotten

[11] 4,184,960
[45] Jan. 22, 1980

[54] FILTER PRESS WITH TRANSPORTING AND LOCKING DEVICE

[75] Inventor: Alfons Schotten, Duren, Fed. Rep. of Germany

[73] Assignee: Eberhard Hoesch & Söhne GmbH & Co., Duren, Fed. Rep. of Germany

[21] Appl. No.: 894,508

[22] Filed: Apr. 7, 1978

[30] Foreign Application Priority Data

Apr. 9, 1977 [DE] Fed. Rep. of Germany ....... 2716065

[51] Int. Cl.² ............................................. B01D 25/12
[52] U.S. Cl. ................................................... 210/230
[58] Field of Search ................................ 210/224, 230

[56] References Cited

U.S. PATENT DOCUMENTS

| | | | |
|---|---|---|---|
| 3,306,455 | 2/1967 | Zismer | 210/230 |
| 3,563,386 | 2/1971 | Kurita | 210/230 |
| 3,567,027 | 3/1971 | Kurita | 210/230 |
| 3,915,863 | 10/1975 | Busse et al. | 210/230 |

FOREIGN PATENT DOCUMENTS

| | | | |
|---|---|---|---|
| 1288073 | 7/1961 | Fed. Rep. of Germany | 210/230 |
| 1144689 | 12/1967 | Fed. Rep. of Germany | 210/230 |

*Primary Examiner*—Theodore A. Granger
*Attorney, Agent, or Firm*—Spencer & Kaye

[57] ABSTRACT

A filter press has a plurality of filter plates which are individually shiftable by a gripper of a moving mechanism. The filter plates can be releasably locked to one another by a locking hook pivotally supported on each filter plate and engageable behind a detent pin carried by a respective adjoining filter plate. Each filter plate further has a pivotal detent lever operatively connected with the locking hook of the same filter plate and the detent levers of the respective two adjoining filter plates. When the filter plates are close together, the detent levers, by mutual interaction, are pivoted out of the traveling path of the gripper of the moving mechanism. When the head plate of the filter press is moved away from the filter plate stack, a spring can pivot the detent lever of the outermost filter plate in the opposite direction so as to be engageable by the gripper which, prior to shifting the outermost filter plate, pivots the detent lever which it abutted, whereupon the detent lever effects a pivotal motion of the respective associated locking hook, releasing the latter from the detent pin of the adjoining filter plate. Thereafter, the gripper shifts the outermost filter plate away from the other filter plates. This allows the detent lever of the new outermost filter plate to pivot into the gripper path, whereupon the unlocking and shifting cycle is repeated.

9 Claims, 4 Drawing Figures

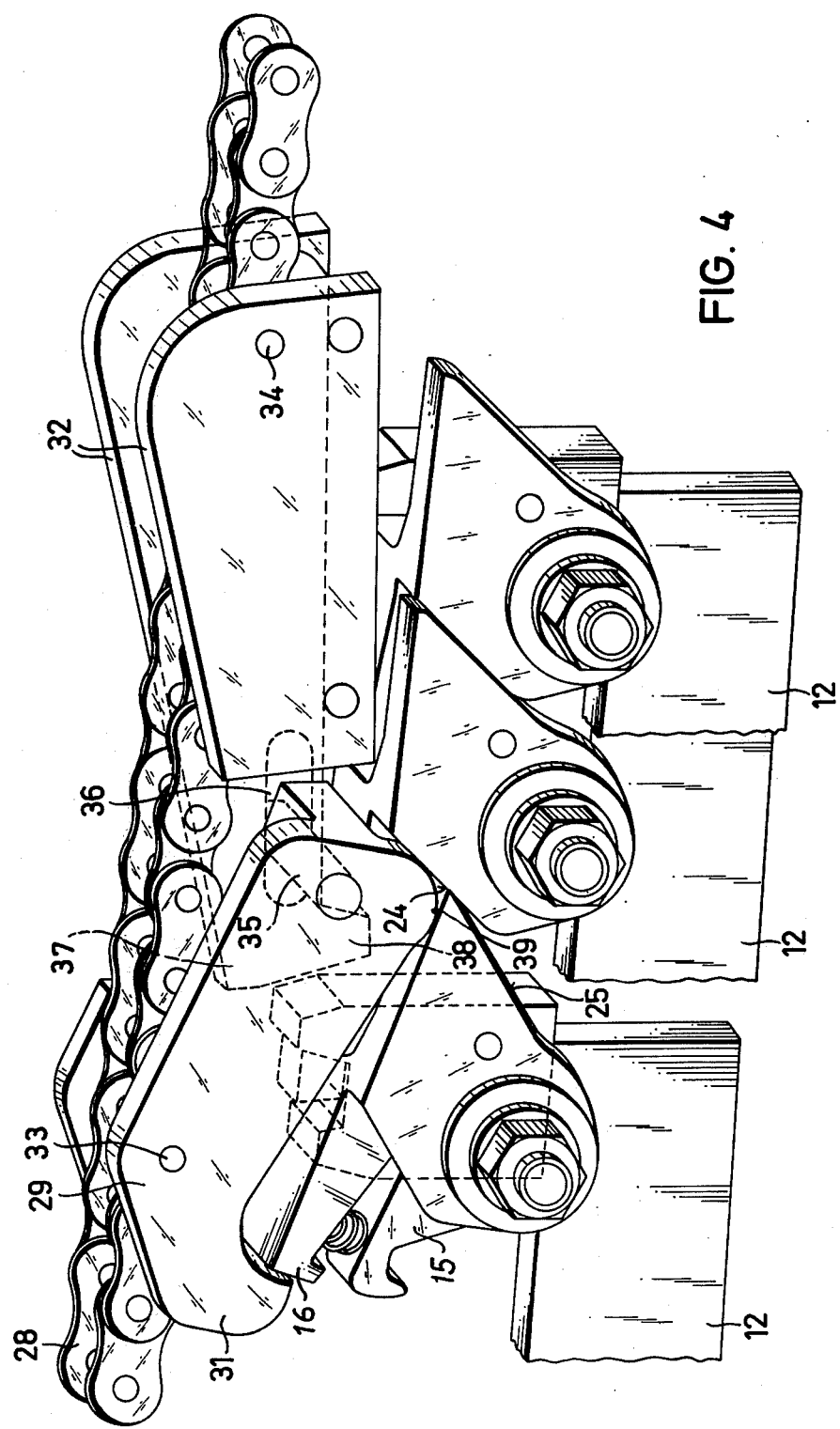

FILTER PRESS WITH TRANSPORTING AND LOCKING DEVICE

BACKGROUND OF THE INVENTION

The invention relates to a filter press having a plurality of filter plates which are displaceably mounted (preferably suspended) on guides. Each filter plate is provided with a locking hook which is pivotal about a bearing pin and, in the closed state, engages in the filter plate that is adjacent in the closing direction. Further, a moving means is provided at which a plurality of spaced hook-shaped grippers are fastened. One of the grippers is connectable with the locking hook of the respective filter plate for the purpose of opening and transporting that filter plate.

Filter presses of the above-mentioned type are known from German Pat. Nos. 1,144,689 and 1,288,073. The drawback of the known structures is that not only the locking hooks but also the hook-shaped grippers must be adapted each time to the thickness of the filter plates employed. Since the unlocking is effected by means of the gravity of the gripper hook, increased friction or jamming of the gripper may prevent unlocking of the filter plate so that a malfunction or even a break may occur. A further problem is that during transport by the gripper the filter plate is able to move freely in the transporting direction even while the transporting device is switched off by means of a switching device, for example a light barrier. At high transporting speeds and low frictional resistance between filter plates and guide, the filter plates cannot be stopped so that the operating personnel is not protected from accidents. Finally, it is a further drawback that after transporting the filter plates, the unlocking from the gripper is effected by the previously transported filter plate. Simultaneously with the release of the gripper hook, the locking hook of the preceding filter plate must engage in the filter plate presently being transported so that a recoil and thus the danger of an accident for the operating personnel are prevented. Since, however, a certain tolerance must be permissible in such mechanical devices, a certain functional safety spacing is necessary. This safety spacing is then bridged by the kinetic energy of the plate presently being transported. If, however, in these systems the operating personnel take switching measures in the final phase of the transporting path so as to intervene in the transporting process, the operational dependability of the known systems disappears. In the decisive functional phases, that is, the unlocking of the gripper hook during opening of the lock and engagement of the locking hook at the end of the transporting process, the known transporting devices operate only with the aid of kinetic energy. Orderly operation is assured only if the motion forces are greater than the friction forces.

SUMMARY OF THE INVENTION

It is an object of the invention to provide a filter press of the above-mentioned type in which the above-mentioned drawbacks are avoided in that the individual functional phases of unlocking, transporting and locking are effected in a form-locking and positive manner.

This object and others to become apparent as the specification progresses, are accomplished by the invention, according to which, briefly stated, the filter press has a plurality of filter plates which are individually shiftable by a gripper of a moving mechanism. The filter plates can be releasably locked to one another by a locking hook pivotally supported on each filter plate and engageable behind a detent pin carried by a respective adjoining filter plate. Each filter plate further has a pivotal detent lever operatively connected with the locking hook of the same filter plate and the detent levers of the respective two adjoining filter plates. When the filter plates are close together, the detent levers, by mutual interaction, are pivoted out of the traveling path of the gripper of the moving mechanism. When the head plate of the filter press is moved away from the filter plate stack, a spring can pivot the detent lever of the outermost filter plate in the opposite direction so as to be engageable by the gripper which, prior to shifting the outermost filter plate, pivots the detent lever which it abutted, whereupon the detent lever effects a pivotal motion of the respective associated locking hook, releasing the latter from the detent pin of the adjoining filter plate. Thereafter, the gripper shifts the outermost filter plate away from the other filter plates. This allows the detent lever of the new outermost filter plate to pivot into the gripper path, whereupon the unlocking and shifting cycle is repeated.

The above arrangement according to the invention assures that all movement during unlocking, transporting and locking again is positively controlled; thus, the introduction of the force to actuate the unlocking process is triggered not by the gravity of the gripper hook but by a force derived from the movement of the moving means and acting on the detent lever via the gripper hook, thus providing a positive control.

According to an advantageous further feature of the invention, the locking hook and the detent lever are mounted on the same bearing pin. This results in a particularly favorable sequence of the individual interengaging movements of locking hook and detent lever.

According to another advantageous feature of the invention, the detent lever encloses the locking hook on both sides. This results in a particularly favorable introduction of force for the transporting forces transmitted from the gripper hook to the detent lever so that tipping of the detent lever transversely to the axis of rotation with respect to the locking hook is prevented.

According to another feature of the invention, the elastic support is formed by a compression spring element which spreads apart the locking hook and the detent lever at the hook-side end of the locking hook. The spreading movement is limited, on the one hand, by the detent bolt of the detent lever and, on the other hand, by a projection on the locking hook. As a result, the detent lever of the plate to be transported is pivoted upwardly under force by a certain degree so that it can securely be gripped by the gripper. The gripper then pivots the detent lever in the same sense of rotation and, since the detent bolt connected therewith acts on a projection of the locking hook, the locking hook is raised in the same sense of rotation and disengages from the detent bolt of the adjacent plate so that thereafter, without interruption of movement, the moving means can transport the respective filter plate.

According to another advantageous feature of the invention, the detent lever is provided with a projection which engages in a recess in the filter plate suspension which limits the pivotability of the detent lever to both sides.

According to still another feature of the invention, the gripper comprises two levers which are connected together by means of a pin-and-slot connection. The ends of the levers facing away from the pin-and-slot connection are each pivotally connected with the moving means. One lever of the gripper is provided with a gripper tongue and a control tongue. A connecting line from the points of contact of the gripper tongue to the pin and a connecting line from the control tongue to the pin form an approximately right angle and the distance from the pin to the point of contact of the control tongue is greater than a multiple of the distance of the pin from the point of contact of the gripper tongue. The other lever is provided with a tongue which, during the transporting movement, rests against an abutment face of the filter plate suspension.

BRIEF DESCRIPTION OF DRAWINGS

FIG. 4 is a perspective view of the plate locking mechanism, illustrating the locking process at the opening side.

DESCRIPTION OF THE PREFERRED EMBODIMENT

Figure 1:
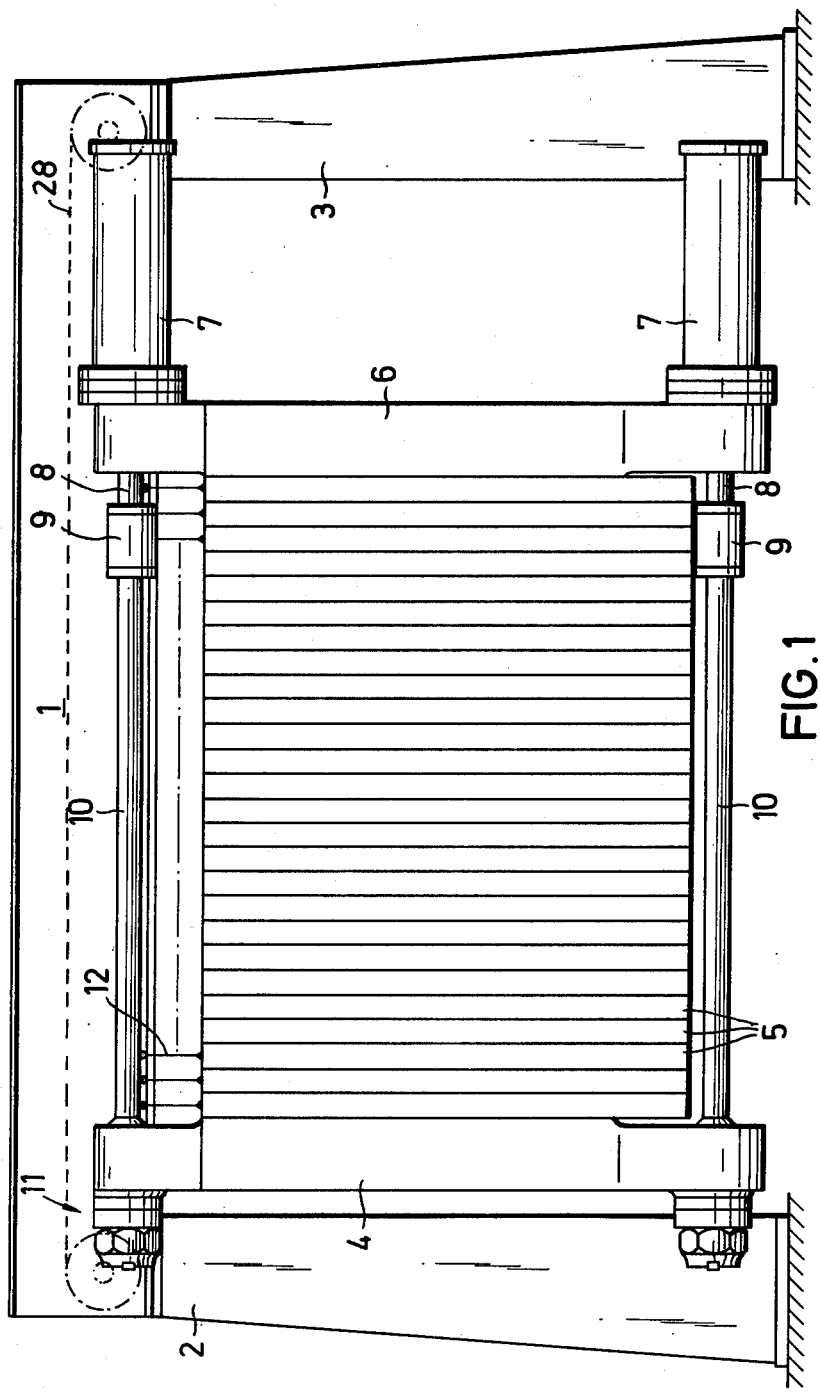
FIG. 1 is a side elevational view of a plate filter press in the closed state.

The plate filter press shown in FIG. 1 in a side view in its closed state has a guide carrier 1 which is supported on the ground at both ends by stands 2 and 3. The guide carrier is designed, for example, as an I-beam from whose lower flange an end plate 4, a plurality of filter plates 5 as well as a head plate 6 are suspended. The end plate is fastened to the guide carrier 1 in a stationary manner while the head plate is displaceably mounted on the guide carrier 1. The filter plates 5 are connected with the lower flange of the guide carrier by means of suspensions 12 which permit displacement of the individual filter plates during opening and closing of the plate filter press in the direction of its longitudinal axis.

Four hydraulic piston and cylinder units 7 are fastened to head plate 6, each in one of the corner regions. The piston rods 8 of each piston and cylinder unit are connected by means of a coupling 9 to pull rods 10 which themselves are connected to the end plate by means of spherical bearings 11. The piston and cylinder units 7 are connected to an oil supply via an appropriate control device in a manner not shown in detail so that during the filtering process the filter plate stack 5 can be compressed with the required closing pressure. The individual filter plates are firmly locked together (in a manner to be explained in detail below), so that, after termination of the filtering process, the head plate can be shifted with the aid of the piston and cylinder units from the illustrated closed position into the open position without the filter plate stack being opened. In order to eject the filter cake or to effect possibly required cleaning, a moving means which extends in the longitudinal direction of the guide carrier 1 at the level of the suspensions 12 and which is provided with hook-like grippers to be described in detail below, shifts the filter plates 5 individually and in succession in the direction toward the head plate 6 which had already been moved into the open position. The gripper hooks are designed so as to unlatch the plate to be transported from the adjacent plate. As will be described in detail below, the respective filter plate being transported is locked again at the moment it arrives at the filter plate stack which rests against the head plate 6 in its open position. Before a new filtering process is initiated, the filter plates as a whole are shifted back by the head plate 6 against the end plate 4 by means of the hydraulic cylinders 7 and are then pressed against the end plate 4 with the necessary closing pressure.

Figure 2:
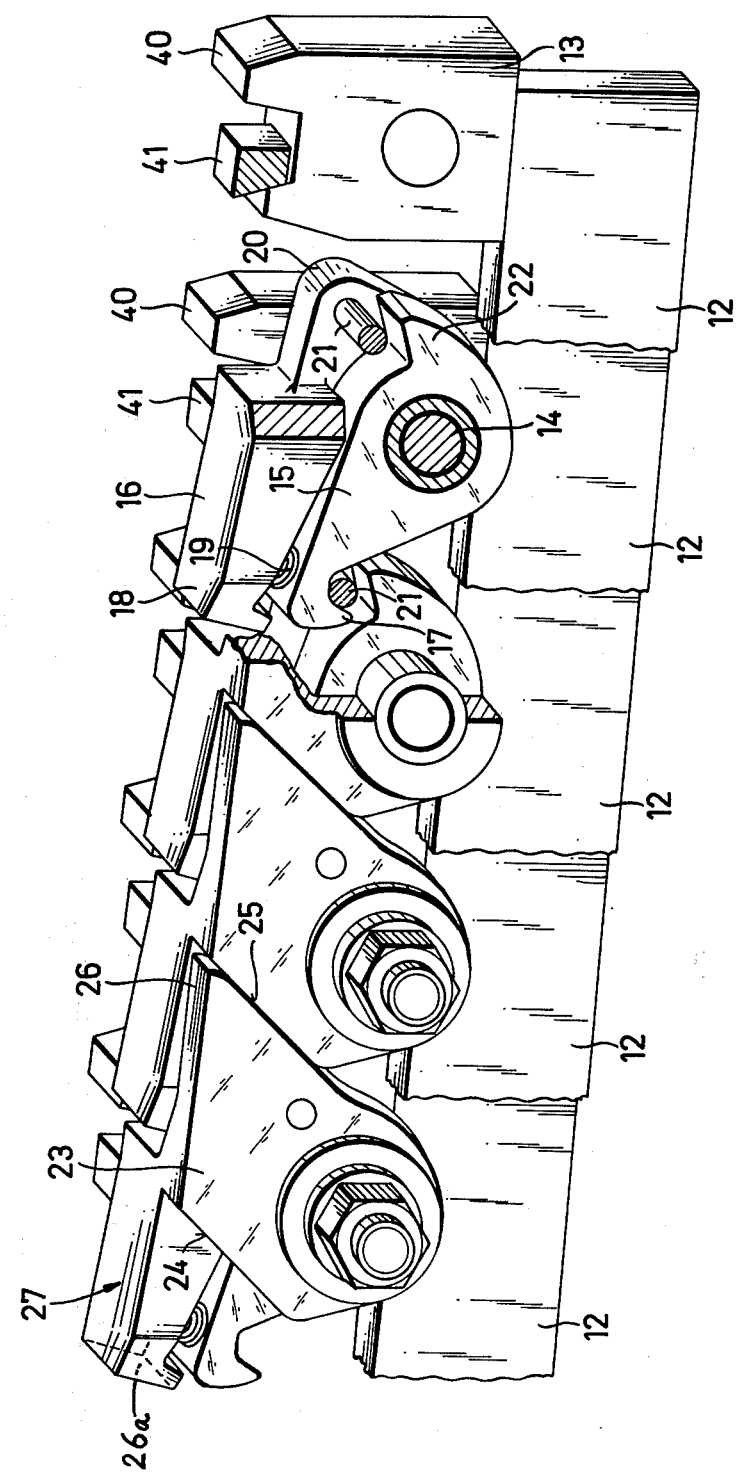
FIG. 2 is a detailed perspective view of the plate locking mechanism.

The perspective view of FIG. 2 shows part of the filter plate suspension 12 of a closed filter plate stack. A pin 14 on which a locking hook 15 and a detent lever 16 are mounted for a coaxial pivotal motion, is fastened to a projection 13 of each filter plate suspension 12. The detent lever 16 is designed so as to enclose the locking hook 15 on both sides. That end 18 of the detent lever which is disposed above the hook-side end 17 of the locking hook, is supported on the locking hook with the aid of a compression spring 19. The other end 20 of the detent lever is connected with a detent pin 21 which can abut a projection 22 of the locking hook 15.

As shown in the locking unit on the far left of FIG. 2, the detent lever 16 which extends over the locking hook 15 has a lateral projection 23 which is delimited on the outside by two mutually parallel control faces 24, 25 and on its upper side by a control face 26. The control face 26 is disposed slightly lower than the upwardly oriented face 27 of the detent lever 16.

Figure 3:
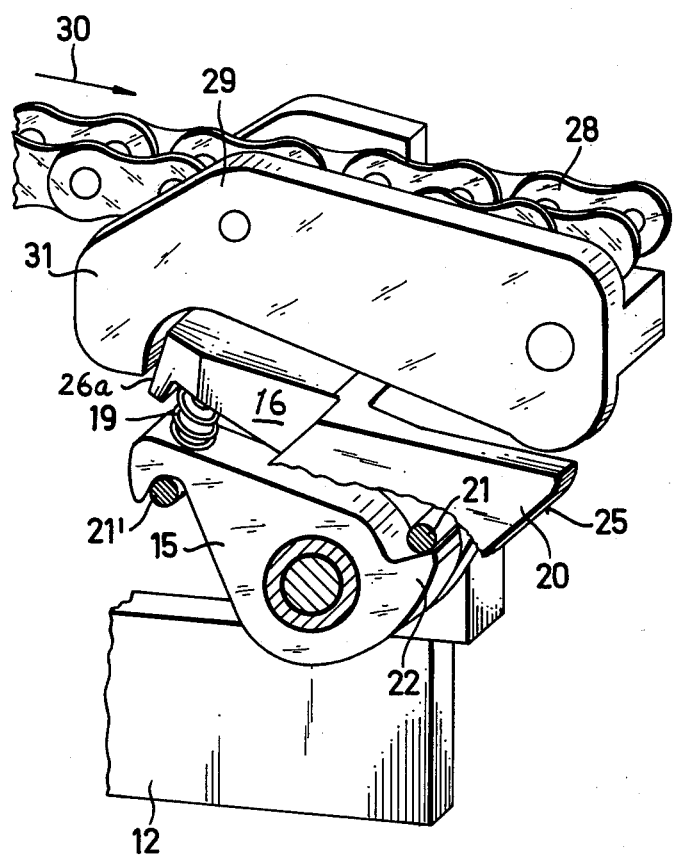
FIG. 3 is a perspective view of an individual lock in cooperation with a gripper.

FIG. 3 shows the operation of the locking device in cooperation with a gripper of the moving means during the initiation of the unlocking and transporting process. In order to open the filter press, as mentioned above, the head plate 6 is first shifted by the piston and cylinder unit away from the filter plate stack. The head plate, in the appropriate association with the locking devices of the filter plate stack, has a control face which corresponds to the control face 24 and at which the control face 25 of the filter plate immediately adjacent to head plate 6 comes to rest in the closed state. If the head plate is moved, the control face 25 is released so that the detent lever 16 is pivoted upwardly (that is, clockwise as viewed in the Figures) under the influence of the force of compression spring 19 until the pin 21 comes to rest against the projection 22 of the locking hook 15.

Since, as shown in FIG. 2, the detent levers 16 in the closed state lie approximately in the same plane, the detent lever 16 of the respective thus released filter plate is deflected upwardly when the head plate is opened. Since the locking hook 15, however, is still connected with the locking bolt 21' of the filter plate therebehind, the outermost filter plate next to be transported continues to remain firmly locked to the filter plate stack.

The filter plates are transported conventionally by a moving means 28, for example a roller chain, which is guided in an endless manner slightly above the individual locking devices at the guide carrier 1. The reach of the chain directly adjacent the filter plate stack moves in the direction of the arrow 30. Many ways are known for arranging and guiding such a chain in plate filter presses.

A hook-shaped gripper 29 is connected with the chain and in its simplest form may be fixedly attached to the chain. A special embodiment of such a gripper will be explained below in conjunction with FIG. 4.

As shown in FIG. 3, during the course of movement of chain 28 in the direction of arrow 30, the hook-shaped portion 31 of gripper 29 comes to rest against an end face 26a of the raised detent lever 16 of the last filter plate of the filter plate stack when seen in the direction of movement of the chain. Since the chain and the gripper 29 continue to move in the direction of arrow 30, the detent lever 16 is pivoted to a small extent further in a clockwise direction so that the detent pin 21 at the end 20 of detent lever 16 likewise pivots the locking hook 15 clockwise and upward as the detent pin 21 presses down on the projection 22. As a result, the hooked end 17 of the locking hook 15 can disengage from the detent bolt 21' of the preceding filter plate and thus the filter plate can be moved in the direction of the arrow 30 until it reaches the head plate 6 or the part of the filter plate stack which is already situated at the head plate 6, respectively.

As can be seen in FIG. 4, the filter plate to be transported abuts with its guide face 25 on the guide face 24 of the filter plate which had been moved with the preceding stroke and is already resting against the head plate. With this movement, the detent lever 16 is pivoted downwardly counterclockwise so that its end 18 can disengage from the hook 31 of the gripper 29. At the same time, hook 17 of the already moved plate engages in the detent pin 21 of the plate presently being transported so that this plate too, is locked tightly and a recoil or rollback can no longer occur.

A special, particularly advantageous embodiment of the hook-shaped gripper will be explained in detail with the aid of FIG. 4. In this embodiment, the gripper comprises the already mentioned hook member 29 and a pivot member 32 connected therewith. The hook-shaped member 29 as well as the pivot member 32 are connected with the roller chain 28 via pins 33 and 34, respectively. The connection between the two members is effected via a pin-and-slot connection which is formed by a pin 35 that is fixedly connected with gripper 29 and an elongated slot 36 which is disposed in an extension of part of pivot member 32 and through which the pin 35 projects. The extension 37 of member 32 has a downwardly oriented tongue 38.

As can be seen in FIG. 4, part 29 of the gripper is designed as a two-armed lever, the part forming the hook 31 being shorter than the part bearing the pin 35. The part bearing the pin 35 is additionally provided with a guide face 39 which, when the filter plate stack is closed, is able to slide over the superposed guide faces 26 of the individual detent levers. At the moment when the hook 31 comes into contact with the end 18 of a raised detent lever 16 (see FIG. 3), the gripper 29 is pivoted about its pin 33 so that a corresponding force is exerted via its guide face 25 on the end 20 of the detent lever 16 and thus the pivoting process to unlock the plate is enhanced.

As can be seen in FIG. 4, during the entire transporting process the end of gripper member 29 facing away from the hook portion is pivoted downwardly. Thus the end 37 and its tongue 38 are also pivoted downwardly with tongue 38 being pivoted downwardly so far that it can serve as arresting means for projection 40 at the filter plate suspension 12. This arrangement provides that, upon the occurrence of a malfunction, for example in an emergency shut-off during transport, the filter plate being transported is prevented by tongue 38 via its projection 40 from further movement along its guides in the transporting direction 30.

If now, as shown in FIG. 4, the filter plate being transported comes to rest against the filter plate stack already resting against the head plate 6, the guide face 25 abuts the guide face 24 of the last plate already there, so that the detent lever and the locking hook are pivoted downwardly in a counterclockwise direction. At the same time this presses upwardly the pin-and-slot connection of the gripper via the guide face 39 of member 29. The guide face 39 rests on guide face 26 and tongue 38 can move freely over the projections 40 of the other plates. Simultaneously the locking hook of the last plate already in the plate stack engages in the locking pin of the newly arriving plate. The distance from the pivot pin 33 to the guide face 39 is more than a multiple of the distance from the pivot pin 33 to the points of contact of the hook-shaped portion 31 with the respective detent lever 16. In the embodiment illustrated in FIG. 4 the above-noted longer distance is more than twice the length of the above-noted shorter distance.

The total pivoting path of detent lever 16 is limited by a lateral projection 41 at detent lever 16 which engages in a corresponding recess in the filter plate suspension 12 (see FIG. 2).

It is to be understood that the above description of the present invention is susceptible to various modifications, changes and adaptations, and the same are intended to be comprehended within the meaning and range of equivalents of the appended claims.

What is claimed is:

1. In a filter press having a guide carrier; a plurality of filter plates supported by the guide carrier and being shiftable therealong to assume a first face-to-face, stacked position in a closed state of the filter press at a first side thereof and a second face-to-face stacked position in an open state of the filter press at a second side thereof; a releasable locking means mounted on each filter plate for releasably locking adjoining filter plates to one another in the first and second stacked positions; and moving means including a gripper driven in the direction of the filter plate displacement from the first side to the second side and sequentially cooperating with each releasable locking means for unlatching the filter plates from one another and effecting displacement thereof from the first side towards the second side; the improvement in said locking means in each filter plate, comprising:

(a) a pivotally mounted locking hook having a hooked end;

(b) a detent lever swingably supported by a pivot and having an end face arranged for cooperating with said gripper; said detent lever having first, second and third pivotal positions; in said first pivotal position said end face is clear of the traveling path of said gripper; in said second pivotal position said end face is in the traveling path of said gripper for being engaged thereby to pivot said detent lever into said third pivotal position; and in said third position said detent lever maintains said locking hook in a disengaged state;

(c) a detent pin affixed to said detent lever at a location spaced from said pivot of said detent lever, said detent pin cooperating with the hooked end of the locking hook of the adjoining filter plate oriented towards said second side;

(d) coupling means connecting, in the same locking means, the detent lever to the locking hook for pivoting the locking hook by the detent lever into disengagement from the associated detent pin upon motion of said detent lever from said second pivotal position to said third pivotal position by the force exerted by said gripper on said end face of said detent lever;

(d) spring means urging said detent lever into said second pivotal position; and (f) first and second camming control faces on said detent lever cooperating with the respective second and first camming control faces on the detent levers of adjoining filter plates; wherein the positional relationship between the camming control faces, the detent pin, the end face of said detent lever and the locking hook is such that said detent lever moves into said second pivotal position from said first pivotal position when the first camming control face of an adjoining filter plate disengages from said second camming control face, and that, when a filter plate arrives in said second side carried by said gripper, the detent lever of the last-named filter plate moves into said first pivotal position from said third pivotal position by the force exerted by the first camming control face of an adjoining filter plate on said second side; the movement of said detent lever into said first pivotal position from said third pivotal position effects simultaneously a disengaging movement of said end face of said detent lever from said gripper and an engaging movement of said detent pin into an interlocking relationship with the locking hook of the adjoining filter plate on said second side.

2. A filter press as defined in claim 1, wherein said locking hook is swingably mounted on said pivot of said detent lever.

3. A filter press as defined in claim 1, wherein said coupling means is formed by said detent pin and a portion of said locking hook remote from said hooked end and cooperating with said detent pin.

4. A filter press as defined in claim 1, further comprising mounting means forming part of each filter plate and carrying the respective locking means; means defining a projection in each mounting means; further wherein said gripper comprises (a) a first lever swingably mounted on said moving means by a first pivot; said first lever having a hook-shaped position cooperating with said end face of said detent lever; said first lever further having a guide face cooperating with an upper contact face of said detent levers; the distance from said first pivot to said guide face being more than twice the distance from said first pivot to points of contact of said hook-shaped portion with the respective detent lever;

(b) a second lever swingably mounted on said moving means by a second pivot being spaced from said first pivot; said second lever having a tongue cooperating with said projection of the respective mounting means for engaging said projection during displacement of the respective filter plate; and (c) connecting means spaced from said first and second pivots for coupling said first and second levers with one another; said connecting means being formed of a slot provided in one of said first and second levers and a coupling pin affixed to the other of said first and second levers and extending into said slot.

5. A filter press as defined in claim 1, wherein said detent lever has a lateral projection carrying said camming control faces.

6. A filter press as defined in claim 1, wherein said detent lever surrounds said locking hook at both sides.

7. A filter press as defined in claim 1, further comprising mounting means forming part of each filter plate and carrying the respective locking means; means defining a recess in each mounting means; and a projection forming part of each detent lever; said projection cooperating with said recess for limiting the pivotal motion of the respective detent lever in either direction.

8. A filter press as defined in claim 1, wherein said detent lever has first and second integral arms situated above said locking hook; said spring means being arranged between and in contacting relationship with said first arm and said hooked end of said locking hook; said detent pin being affixed to said second arm.

9. A filter press as defined in claim 8, wherein said coupling means is formed by said detent pin and a portion of said locking hook remote from said hooked end and cooperating with said detent pin; and wherein said spring means is a compression spring urging said first arm of said detent lever lever away from said hooked end of said locking hook; said first pivotal position of said detent lever being determined by an abutting relationship between said detent pin and said portion of said locking hook.

* * * * *